United States Patent
Krausz

[19]

[11] Patent Number: 5,941,576
[45] Date of Patent: Aug. 24, 1999

[54] CONNECTOR AND COUPLING MEANS

[76] Inventor: Eliezer Krausz, 6 Hapatish Street, Tel Aviv 66559, Israel

[21] Appl. No.: 08/922,698

[22] Filed: Sep. 2, 1997

[51] Int. Cl.[6] .............................. F16L 17/00; F16L 25/00
[52] U.S. Cl. .................... 285/110; 285/111; 285/369; 285/345; 285/337; 285/906
[58] Field of Search ................... 285/108, 110, 285/111, 337, 367, 366, 365, 420, 364, 345, 369, 906; 277/603, 605

[56] References Cited

U.S. PATENT DOCUMENTS

| | | | |
|---|---|---|---|
| 293,734 | 2/1884 | Harrison | 285/366 X |
| 2,269,664 | 1/1942 | Hallerberg | 285/367 X |
| 2,541,205 | 2/1951 | Christophersen | 285/367 X |
| 3,029,946 | 4/1962 | Wright, Jr. et al. | 285/367 X |
| 3,315,970 | 4/1967 | Holloway | 285/111 X |
| 3,432,189 | 3/1969 | Buller | 285/366 |
| 3,485,515 | 12/1969 | Frishof | 285/420 X |
| 3,486,772 | 12/1969 | Elsner | 285/605 X |
| 3,680,894 | 8/1972 | Young | 285/367 X |
| 3,724,878 | 4/1973 | Ford | 285/367 X |
| 4,163,571 | 8/1979 | Nash | 285/367 X |
| 4,471,979 | 9/1984 | Gibb | 285/367 X |
| 4,824,148 | 4/1989 | Grabowski | 285/110 |
| 5,257,834 | 11/1993 | Zeidler et al. | 285/367 X |

FOREIGN PATENT DOCUMENTS 2098297  11/1982  United Kingdom .................. 285/366

*Primary Examiner*—James R. Brittain
*Assistant Examiner*—Gary Grafel
*Attorney, Agent, or Firm*—Edwin D. Schindler

[57] ABSTRACT

A connector or coupling device for pipes of different materials and different diameters. The connector is formed by a single integral sleeve of roughly barrel shape. The two open end portions of the sleeve are defined by a narrow slightly outwardly flaring flange. The connector is further provided by at least one angular U-shaped ring having two ears adapted to receive a screw and bolt for tightening the ring.

6 Claims, 5 Drawing Sheets

CONNECTOR AND COUPLING MEANS

FIELD AND BACKGROUND OF THE INVENTION

The present invention relates to coupling and connecting means to be used with pipes of different materials and also with hose like fluid conduits of plastics, rubber or like materials. The connecting means could also be used with two abutting pipes of different diameters.

There are known and exist many types of conduits for fluids, such as water pipes, sewage pipes, gas, oil pipes and others as well as hose like conduits, these latter are composed of pipe or hose sections which are connected to each other by various connecting means.

There are known also in the trade a large number of connecting and coupling means of different configurations and build.

OBJECTS OF INVENTION

It is an object of the invention to provide a connecting and coupling means for pipes.

It is a further object of the invention to provide a connecting and coupling which could be easily fitted on the pipes to be connected and easily tightened.

It is yet a further object of the invention to provide such coupling and connecting means which is of low cost.

SUMMARY OF THE INVENTION

According to the invention the new connector is formed by a single integral sleeve of roughly barrel shape, the two open end portions of which are defined by a narrow, slightly outwardly flaring circumferential flange of the connector wall, there is further provided at least one angular U-shaped ring having two ears adapted to receive a screw and bolt for tightening said ring radially, into the cavity of said U-shaped ring wherein a circumferential seal is placed.

BRIEF DESCRIPTION OF THE DRAWING FIGURES

The invention will now be described with reference to the annexed drawings in which:

FIG. 1 is a perspective view of the new means, while

DETAILED DESCRIPTION OF THE DRAWING FIGURES AND PREFERRED EMBODIMENTS

Figure 1:
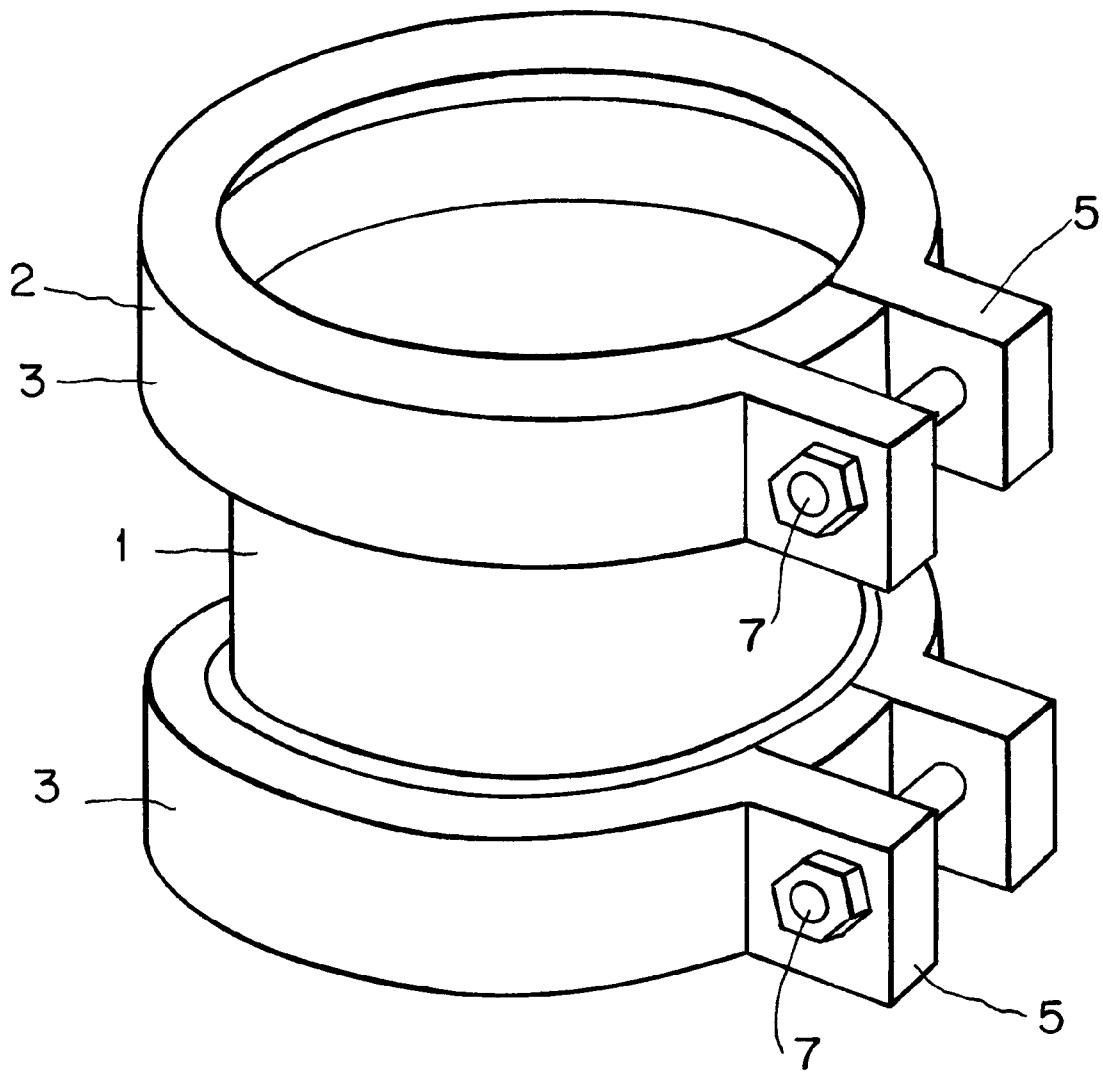

Turning first to FIG. 1, the connecting means comprises a sleeve like body 1 provided with two end flanges 2, and in the present embodiment two circumferential clamping rings 3 having two ears 5 and a screw and bolt 7.

Figure 2:
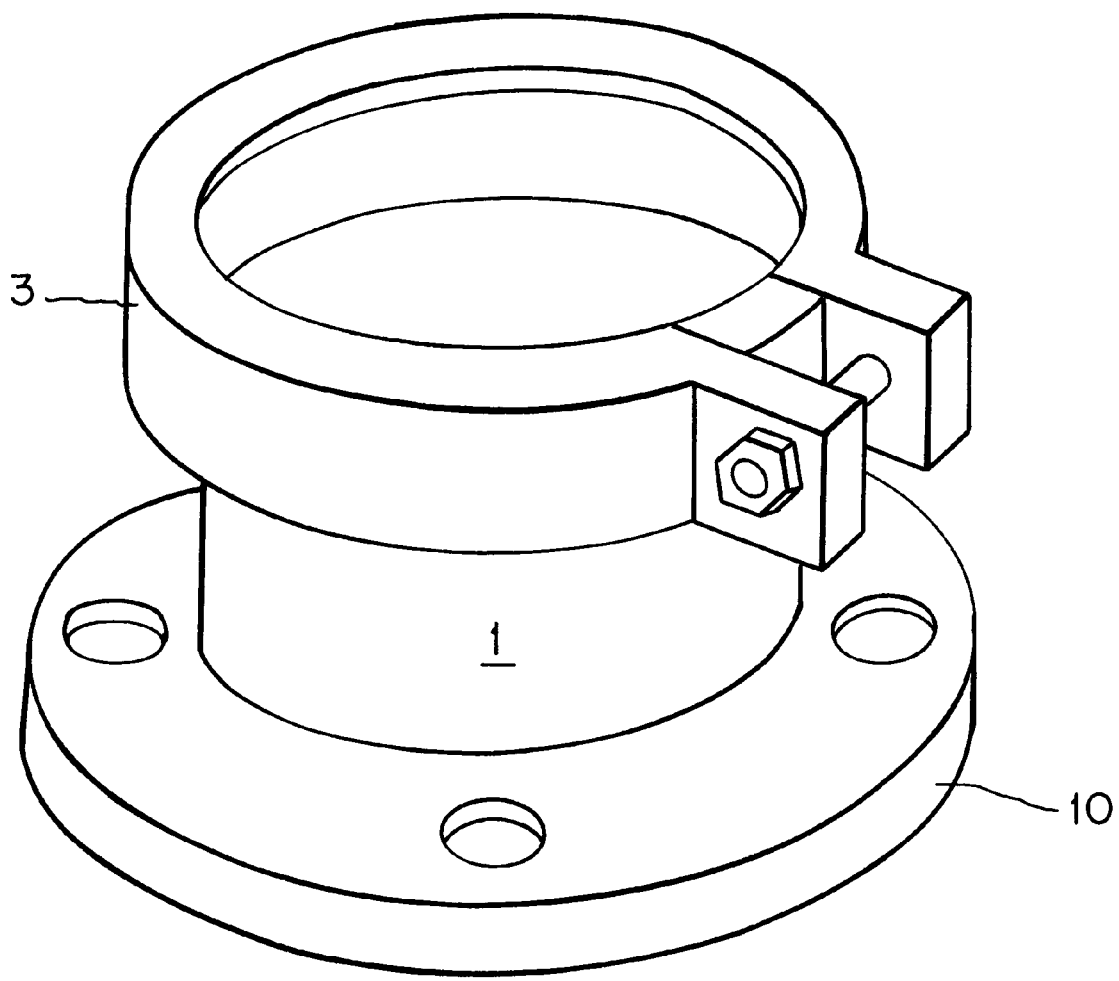
FIG. 2 is an embodiment thereof.

In the embodiment shown in FIG. 2, there is provided only one clamping ring 3, preferably, having the unitary construction, as shown while the opposite side of said body 1 is provided with a wide flange 10 to be connected directly to a pipe.

Figure 3:
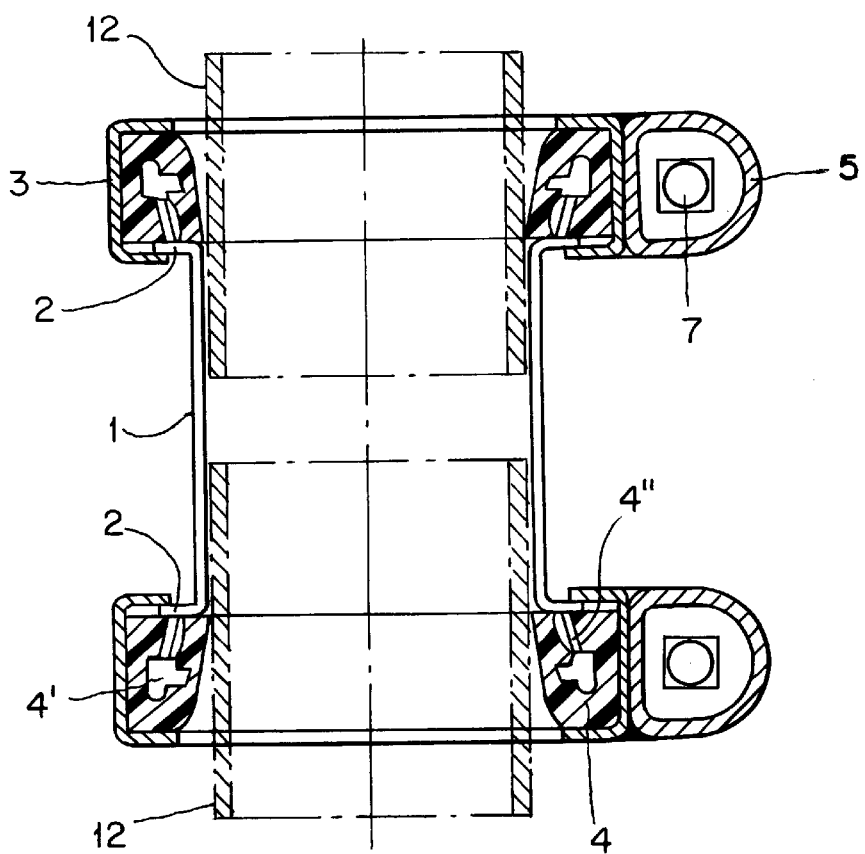
FIG. 3 is a cross section thereof.
Figure 4:
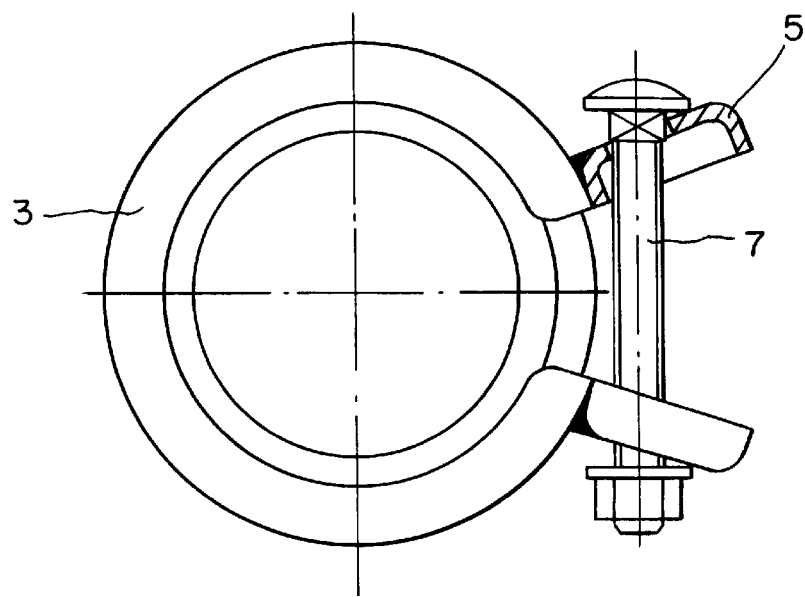
FIG. 4 is an end view thereof.

FIG. 3 is a cross section of the embodiment depicted in FIG. 1, where two abutting pipes 12 are inserted into the connecting means.

The sleeve like body 1 is provided at both ends with flanges 2. Ring members 3 are placed on sleeve 1, such that flange 2 is placed within said ring.

Into the cavity of U shaped ring 3, a seal 4, is placed.

Said seal could be of common cross section, however in the embodiment shown there is provided a seal having an inner space 4' and small apertures 4" which would enable the fluid within pipes 12 to enter space 4' and apply pressure on pipe 12 which would increase the tightness of the connector. Screw bolt 7 is tighten to secure any leakage of the fluid.

Figure 5:
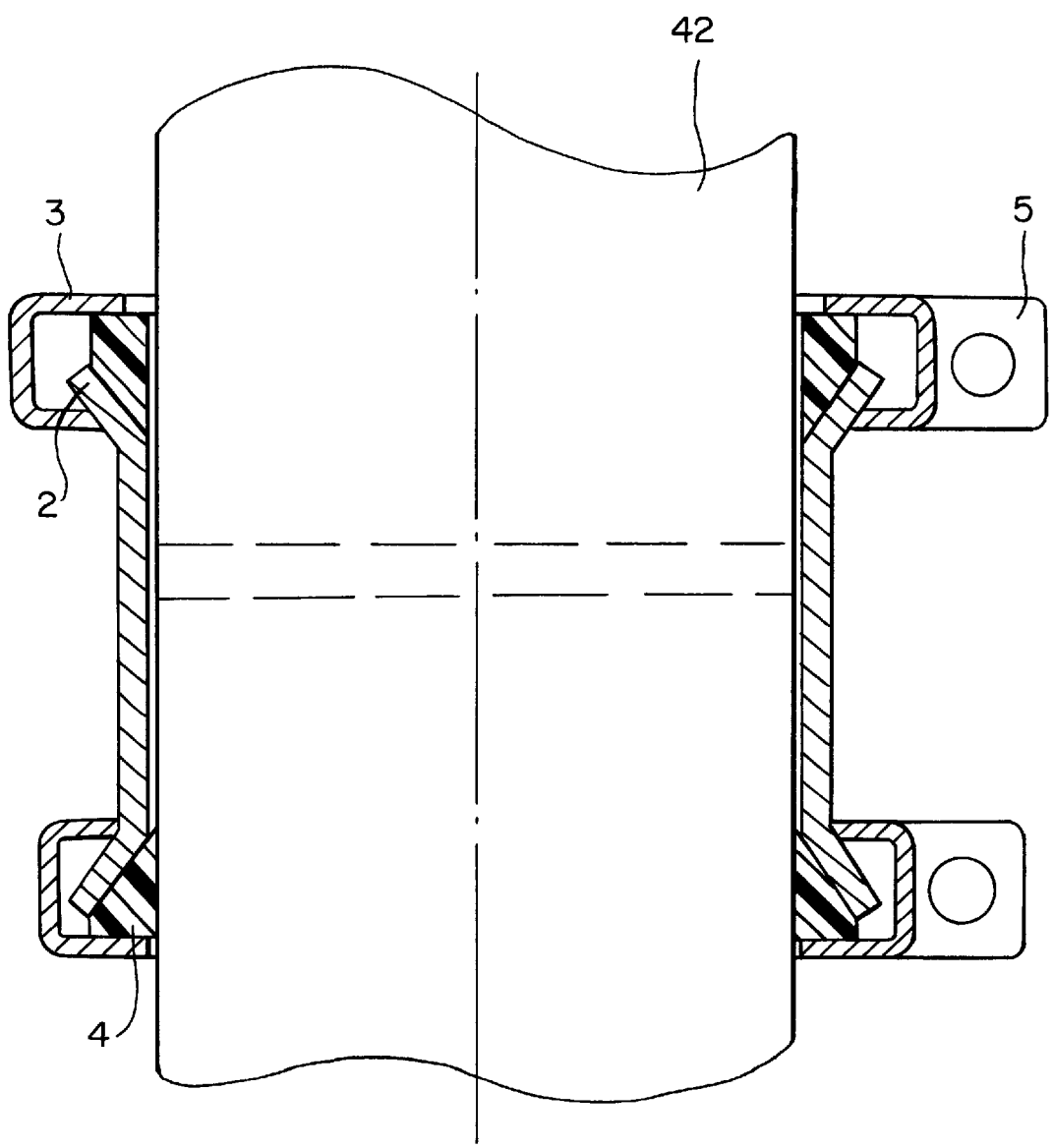
FIG. 5 illustrates a cross section of an embodiment.

In the embodiment shown in FIG. 5 the flange 2 is oblique in relation to sleeve 1. The seal 4 having a complimentary oblique surface is pressured into its position by the tightening of ring 3.

Figure 6:
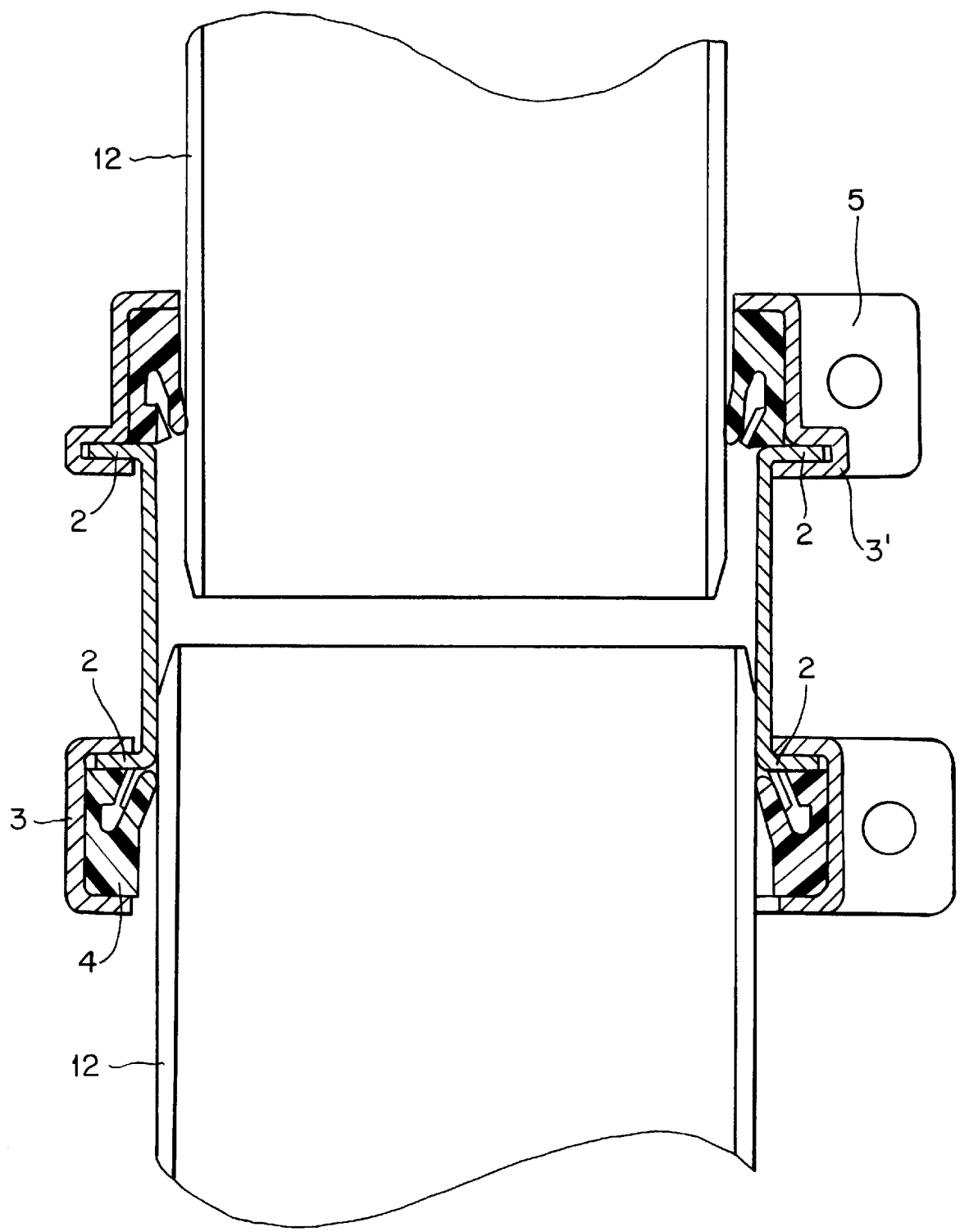
FIG. 6 is cross section of a further embodiment of the invention.

FIG. 6 illustrates an embodiment of the connecting ring means. Two abutting pipes 12 of different diameters are inserted into sleeve member 1. In order to compensate the difference of diameter clamping ring 3 is provided with an extension like part 3 in which flange 2 is fitted.

I claim:

1. A connector for pipes, comprising:

a single integral sleeve having substantially a barrel shape defining a connector body, said connector body having two open end portions defined by an outwardly-flowing, circumferential flange extending from said connector body, and at least one angular, cross-sectional U-shaped ring of a unitary construction having two ears adapted for receiving a screw or bolt for tightening said U-shaped ring radially, said U-shaped ring defining an outer boundary of an inner cavity into which a circumferential seal is placed contiguous to said outer boundary.

2. A connector as claimed in claim 1 where two clamping rings being provided.

3. A connector as claimed in claim 1, where said seal is provided with an inner space.

4. A connector as claimed in claim 1, where said seal is provided with an oblique surface.

5. A connector as claimed in class 1, where said flange is oblique in relation to said connector body.

6. A connector as claimed in claim 1 where said flange is perpendicular in relation to said connector body.

* * * * *